(12) United States Patent
Biran et al.

(10) Patent No.: US 7,733,875 B2
(45) Date of Patent: *Jun. 8, 2010

(54) TRANSMIT FLOW FOR NETWORK ACCELERATION ARCHITECTURE

(75) Inventors: Giora Biran, Zichron Yaakov (IL);
Zorik Machulsky, Gesher HaZiv (IL);
Vadim Makhervaks, Austin, TX (US);
Renato John Recio, Austin, TX (US);
Julian Satran, Atlit (IL); Leah Shalev,
Zichron Yaakov (IL); Ilan Shimony,
Haifa (IL)

(73) Assignee: International Business Machines Corporation, Armonk, NY (US)

( * ) Notice: Subject to any disclaimer, the term of this patent is extended or adjusted under 35 U.S.C. 154(b) by 799 days.

This patent is subject to a terminal disclaimer.

(21) Appl. No.: 11/132,853

(22) Filed: May 19, 2005

(65) Prior Publication Data
US 2006/0262799 A1 Nov. 23, 2006

(51) Int. Cl.
*H04L 12/28* (2006.01)
*G06F 15/16* (2006.01)
*G06F 15/167* (2006.01)
(52) U.S. Cl. .................. 370/395.52; 709/250; 709/212; 370/412
(58) Field of Classification Search .................. 370/412
See application file for complete search history.

(56) References Cited

U.S. PATENT DOCUMENTS 6,173,333 B1 1/2001 Jolitz et al.
2001/0037406 A1* 11/2001 Philbrick et al. ............. 709/250
2004/0042483 A1* 3/2004 Elzur et al. .................. 370/463
2004/0049601 A1* 3/2004 Boyd et al. .................. 709/250
2004/0073703 A1 4/2004 Boucher et al.
2004/0148376 A1 7/2004 Rangan et al.
2005/0204058 A1* 9/2005 Philbrick et al. ............. 709/238
2005/0246443 A1* 11/2005 Yao et al. ..................... 709/227
2006/0133396 A1* 6/2006 Shah et al. .................. 370/412
2007/0115814 A1* 5/2007 Gerla et al. .................. 370/230

FOREIGN PATENT DOCUMENTS

WO WO 2004/021628 * 3/2004

OTHER PUBLICATIONS

Regnier, Greg et al., "ETA: Experience with an Intel Xeon Processor as a Packet Processing Engine", Micro, IEEE, Publication Date: Jan-Feb. 2004, vol. 24, Issue 1, pp. 24-31.

* cited by examiner

*Primary Examiner*—Daniel J Ryman
*Assistant Examiner*—John Blanton (57) ABSTRACT

A method for receiving data in a network acceleration architecture for use with TCP (transport control protocol), iSCSI (Internet Small Computer System Interface) and/or RDMA (Remote Direct Memory Access) over TCP, including providing a hardware acceleration engine, called a streamer, adapted for communication with and processing data from a consumer application in a system that supports TCP, iSCSI and RDMA over TCP, providing a software protocol processor adapted for carrying out TCP implementation, the software control processor being called a TCE (TCP Control Engine), wherein the streamer and the TCE are adapted to operate asynchronously and independently of one another, and transmitting a TCP segment with the streamer.

18 Claims, 7 Drawing Sheets

TRANSMIT FLOW FOR NETWORK ACCELERATION ARCHITECTURE

FIELD OF THE INVENTION

The present invention relates generally to network acceleration, and more particularly to a network acceleration architecture which allows efficient iSCSI (Internet Small Computer System Interface) and RDMA (Remote Direct Memory Access) acceleration, preserves flexibility of TCP (transport control protocol) implementation, and adapts to increasing main CPU (central processing unit) speed, memory bandwidth and latency.

BACKGROUND OF THE INVENTION

RDMA is a technique for efficient movement of data over high-speed transports. RDMA enables a computer to directly place information in another computer's memory with minimal demands on memory bus bandwidth and CPU processing overhead, while preserving memory protection semantics. RNIC is a Network Interface Card that provides RDMA services to the consumer. The RNIC may provide support for RDMA over TCP.

RNIC can serve as an iSCSI target or initiator adapter. "Initiator" refers to a SCSI command requester (e.g., host), and "target" refers to a SCSI command responder (e.g., I/O device, such as SCSI drives carrier, tape).

Much work has been done to create efficient, scalable and flexible RDMA and iSCSI acceleration solutions, but a successful solution is not trivial. One challenge is that all data processing operations must be handled efficiently, while at the same time, the protocol implementation must be flexible. The need for flexibility in protocol implementation is particularly important for TCP, which constantly evolves, attempting to adapt TCP behavior to changing network speed, traffic pattern and a network infrastructure. Another challenge is the ability to adapt to increases in main CPU speed, main memory bandwidth and latency.

One example of a prior art solution, which uses RNICs for network acceleration, is that of embedded processors that handle protocol processing. One or more embedded CPUs are tightly coupled with the data path, and touch each incoming and generated packet. There are different hardware acceleration engines surrounding such embedded CPUs, which assist in different data processing operations. Such a solution is generally limited by the embedded CPU capabilities, which typically lag behind the main CPU technology for several generations. This limits the performance benefits and lifetime of such solutions. Latency is relatively high, since before the packet is generated to the network or placed to the memory, it has to be processed by one or more CPUs. To reach high networking rates, multiple CPUs need to be placed on the data path and perform simultaneous handling of multiple packets. This adds additional latency, makes implementation difficult and increases the cost of the overall solution.

Another prior art solution is a state machine implementation. However, this lacks flexibility in protocol processing, which as mentioned previously, is particularly important in TCP.

SUMMARY OF THE INVENTION

The present invention seeks to provide an improved TCP, RDMA and iSCSI network acceleration architecture, as is described more in detail hereinbelow.

In accordance with a non-limiting embodiment of the invention, heavy data intensive operations are separated from the protocol control. Data processing may include "fast path" execution (defined in the description below) performed by a dedicated hardware acceleration engine, whereas the protocol control operations may be carried out by software. The split of functions between software and hardware is done in such way that allows asynchronous and independent operation of the data processing (hardware) and the protocol control (software). There is a "loose" coupling of the software and hardware components. The invention preserves flexibility in protocol implementation and is capable of sustaining protocol modification, without sacrificing performance and efficiency.

In accordance with a non-limiting embodiment of the invention, a hardware acceleration engine, called a streamer, may communicate with and process data from a consumer application. The streamer may be used to transmit TCP segments. A software protocol processor, called a TCE (TCP Control Engine), may carry out TCP implementation. The streamer and TCE may operate asynchronously and independently of one another.

BRIEF DESCRIPTION OF THE DRAWINGS

The present invention will be understood and appreciated more fully from the following detailed description taken in conjunction with the appended drawings in which.

DETAILED DESCRIPTION OF EMBODIMENTS

Figure 1:
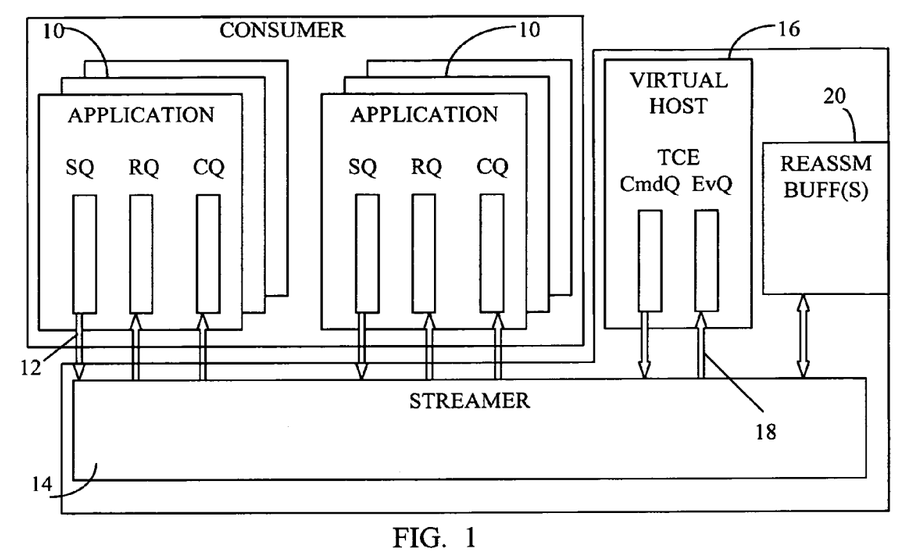
FIG. 1 is a simplified block diagram of a network acceleration architecture in accordance with an embodiment of the present invention.

Reference is now made to FIG. 1, which illustrates a network acceleration architecture in accordance with an embodiment of the present invention.

The network acceleration architecture may include consumer applications 10, which may run on a main CPU complex. The consumer applications 10 may use asynchronous queue based interface(s) 12 to submit work requests to a hardware acceleration engine 14, also referred to as a streamer 14. The interface(s) 12 may be in accordance with the RDMA verb specification.

As is known in the art, RDMA uses an operating system programming interface, referred to as "verbs", to place work requests (WRs) onto a work queue. In brief, queue pairs may be used to transfer messages to the streamer 14 (e.g., memory regions in the streamer 14). Each queue pair may include a send work queue (SQ) and a receive work queue (RQ). For example, the consumer application 10 may generate work requests, which are placed onto a work queue as work queue elements (WQEs). Accordingly, the send work queue may include WQEs that describe data to be transmitted to the streamer 14, and the receive work queue may include WQEs that describe where to place incoming data from the streamer 14. A completion queue may include completion queue elements (CQEs) that contain information about previously completed work queue elements. A completion queue element is a data structure on a completion queue that contains sufficient information to determine the queue pair and specific work queue element that has been completed.

The interface(s) 12 may enable using iSCSI and socket acceleration mechanisms provided by the streamer 14. For example, the streamer 14 may be implemented as an RNIC, which as mentioned above, may provide support for RDMA over TCP and may serve as an iSCSI target or initiator adapter. The RNIC can also provide iSER ("iSCSI Extensions for RDMA") services. iSER is an extension of the data transfer model of iSCSI, which enables the iSCSI protocol to take advantage of the direct data placement technology of the RDMA protocol. iSCSI protocol exchanges iSCSI Protocol Data Units (PDUs) to execute SCSI commands provided by the SCSI layer. The iSER data transfer protocol may slightly change or adapt iSCSI implementation over RDMA; e.g., it eliminates such iSCSI PDUs as DataOut and DataIn, and instead uses RDMA Read and RDMA Write messages. Basically iSER presents iSCSI-like capabilities to the upper layers, but the protocol of data movement and wire protocol is different.

In short, iSCSI uses regular TCP connections, whereas iSER implements iSCSI over RDMA. iSER uses RDMA connections and takes advantage of different RDMA capabilities to achieve better recovery capabilities, improve latency and performance. Since RNIC supports both iSCSI and iSER services, it enables SCSI communication with devices that support different levels of iSCSI implementation. Protocol selection (iSCSI vs. iSER) is carried out on the iSCSI login phase.

The hardware acceleration engine 14 cooperates with a software protocol processor 16, also referred to as a TCP Control Engine (TCE) 16, to provide network acceleration semantics to consumer applications 10. The hardware acceleration engine 14 is responsible to handle data intensive operations, as described in more detail hereinbelow.

TCE 16 is a software component that implements a protocol processing part of the network acceleration solution. This software component implements the decision making part of the TCP protocol. For example, without limitation, TCE 16 may run on a main CPU, dedicated CPU, or on a dedicated virtual host (partition). Streamer 14 and TCE 16 may use an asynchronous dual-queue interface 18 to exchange information between software and hardware parts of solution. The dual-queue interface 18 may include two unidirectional queues. A command queue (CmdQ) may be used to pass information from the TCE 16 to the streamer 14. An event queue (EvQ) may be used to pass information from the streamer 14 to the TCE 16. Streamer 14 and TCE 16 may work asynchronously without any need to serialize and/or synchronize operations between them. The architecture does not put restrictions or make assumptions regarding the processing/interface latency between the hardware acceleration engine 14 and the software protocol processor 16.

Figure 2:
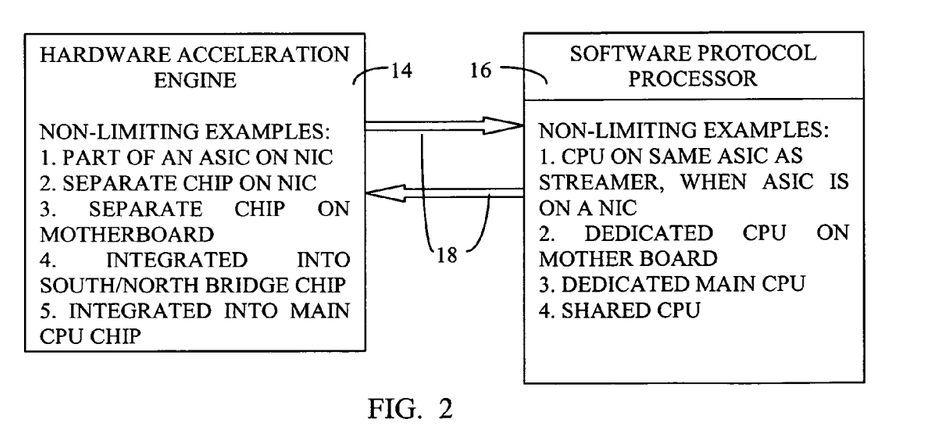
FIG. 2 is a simplified block diagram of different configurations for the streamer and TCE of the network acceleration architecture of FIG. 1.

As seen in FIG. 2, such an architecture allows a wide range of different configurations. For example, without limitation, the hardware acceleration engine 14 can be implemented in an ASIC (application specific integrated circuit), a NIC (network interface card), a chip on a mother board, a PCI (peripheral component interconnect) bus controller chipset, south/north bridges, or be integrated in the CPU. The software protocol processor 16, without limitation, can run on an embedded CPU on the NIC, a dedicated special purpose CPU on the mother board, a dedicated general-purpose main CPU (e.g., in a multi-CPU system), or share the same CPU with applications running on a dedicated virtual host or partition. The invention allows any type of interconnect between the streamer 14 and TCE 16.

As mentioned above, in the network acceleration architecture of the present invention, the data intensive operations are separated from the complex TCP protocol processing. In simplistic terms, receiving and processing a TCP segment may be split into three parts:

1. Fast-Path Segment Validation, Followed by Data Processing, Placement and Delivery if Validation Passed.

The fast-path segment validation sequence may include several basic checks that are sufficient to allow placement and delivery of the segment which passed them. Any segment which fails this sequence is not necessarily an invalid segment, but requires enhanced validation sequence to be applied. The streamer 14 may perform the fast-path segment validation.

The TCP segment is identified to be a fast-path segment if it passes a predefined TCP validation sequence (described in detail below). Accordingly, "fast path" as used throughout the specification and claims refers to handling and/or processing of a segment that has passed a predefined TCP validation sequence. This validation sequence is sufficient to identify a segment to be a valid TCP segment, which then permits the segment to undergo post processing, placement to consumer buffers and delivery without software (TCE) involvement.

If the segment does not pass fast-path validation, the segment is treated as a slow-path segment, and is passed through the reassembly buffers 20. Note that in some cases a valid TCP segment can fail a fast-validation sequence and be handled in slow path. Accordingly, "slow path" as used throughout the specification and claims refers to handling and/or processing of a segment that has not passed the predefined TCP validation sequence used for the fast path.

The streamer 14 may separate the TCP header and payload of each inbound TCP segment (both fast and slow paths), and pass the TCP header with additional information to the TCE 16 for further processing via the EvQ interface.

The payload of the segment which passed fast-path validation may be processed by streamer 14. This may include processing of the RDMA/iSCSI and Socket ULP, depending on the connection type. The ULP processing may be carried out in any suitable manner; the details of the ULP processing are not within the scope of the invention. After processing ULPs, the payload may be placed in consumer buffers (depending on the ULP) and delivered to the consumer.

2. Enhanced Segment Validation

This validation sequence includes various extended checks that cover different cases not covered by the fast-path segment validation. This validation sequence is implemented by TCE 16, and the payloads of segments requiring such validation are temporary stored in the reassembly buffers 20.

3. Implementation of Tcp Protocol—Congestion Window Management, Timer Management, RTTM (Round Trip Time Measurement) Estimation, Retransmit Management, etc.

This part of the receive flow may be implemented by TCE 16. It may be carried out asynchronously with the data processing performed by streamer 14, and does not affect/delay data placement and delivery on the fast path.

Figure 3:
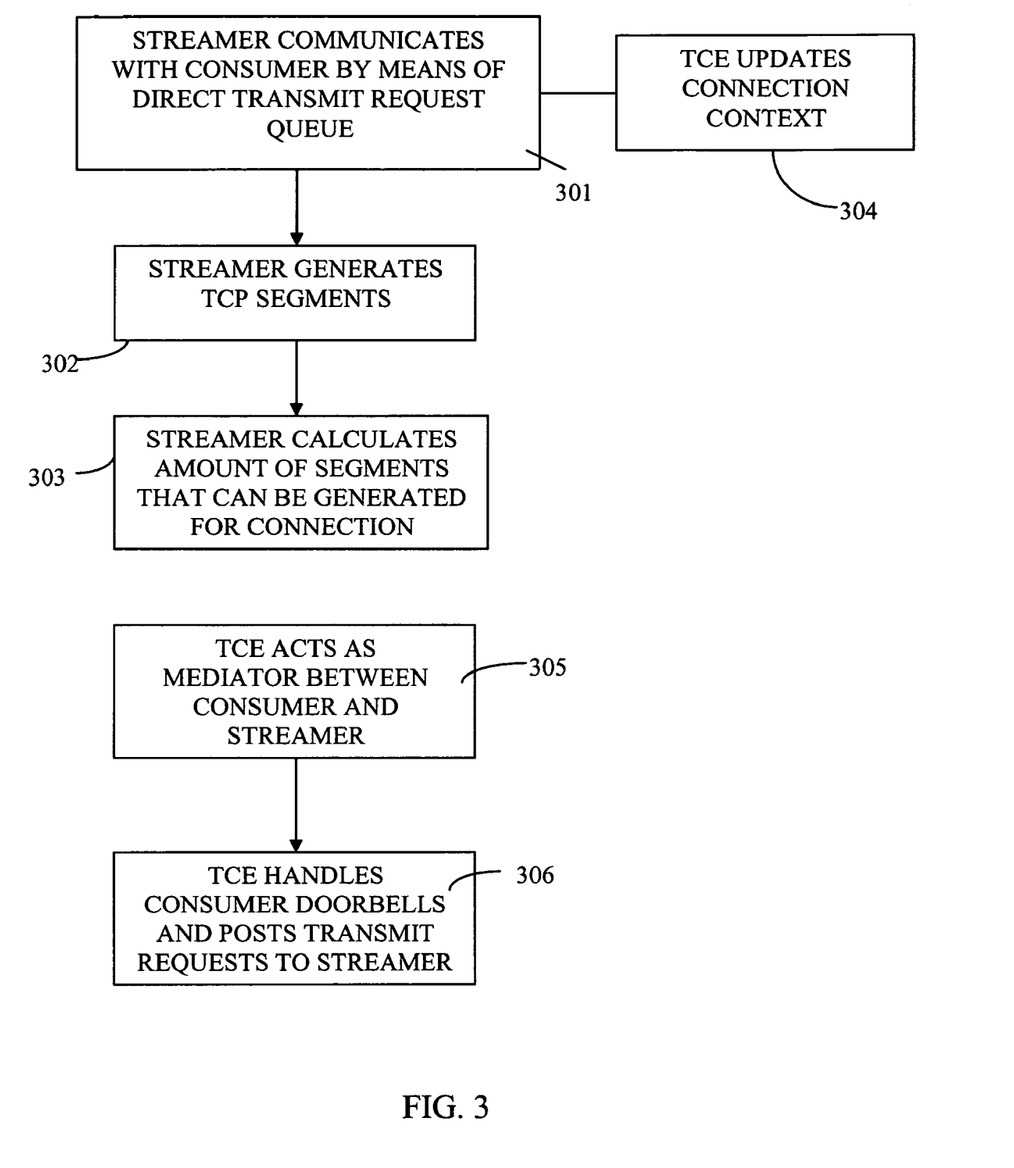
FIG. 3 is a simplified flow chart of transmit flow in the network acceleration architecture, in accordance with an embodiment of the present invention.

Reference is now made to FIG. 3, which illustrates a simplistic flow diagram of transmit flow in a network acceleration architecture, in accordance with non-limiting embodiments of the present invention. The transmit flow according to two non-limiting embodiments will be described more in detail hereinbelow with reference to FIGS. 4-7.

As mentioned above, in the network acceleration architecture of the present invention, the data intensive operations are separated from the complex TCP protocol processing. In accordance with one non-limiting embodiment of the present invention (described more in detail hereinbelow with reference to FIGS. 4 and 5), transmitting a TCP segment may be accomplished by streamer 14 communicating with a consumer by means of a direct transmit request queue, including doorbell ("signaling" of new request availability) (step 301). It is noted that streamer 14 generally makes its own decisions regarding transmit, but TCE 16 may affect the transmit decisions indirectly (and asynchronously) by sending context update commands to streamer 14. The consumer may write a transmit request to the transmit request queue and "ring a doorbell" to signal availability of the request.

Streamer 14 may receive the transmit request from the consumer via the direct transmit request queue. Upon receiving these commands, the streamer 14 may generate TCP segments in appropriate network packets for sending to a network. (step 302), and calculate the amount of segments that can be generated for a given connection context (step 303). The information in the connection context may be asynchronously (with respect to streamer 14) updated by TCE 16 (step 304), which may use special context update requests passed via CmdQ interface.

In accordance with another non-limiting embodiment of the present invention (described more in detail hereinbelow with reference to FIGS. 6 and 7), transmitting a TCP segment may be accomplished wherein TCE 16 acts as a mediator between the consumer and streamer 14 (step 305). TCE 16 handles consumer doorbells and posts transmit requests to the streamer via CmdQ interface (step 306). In this embodiment, the signaling (ringing doorbell) is carried out indirectly through the TCE 16. This allows TCE 16 to "preprocess" the requests, and make some of the decisions that were left to streamer 14 in the embodiment of steps 301-304. TCE 16 may send transmit commands to the streamer 14. TCE 16 may control, for example (without limitation), the order of connection handling, the exact header fields, the exact amount of data in each packet, and others. The consumer queue based interface is still implemented by streamer 14. One difference between the two embodiments is the amount of flexibility in the transmit TCP implementation. In both embodiments, streamer 14 implements the host interface part and different mechanisms required for it, such as Address Translation Protection, Queue-based interface, etc.

Figure 4:
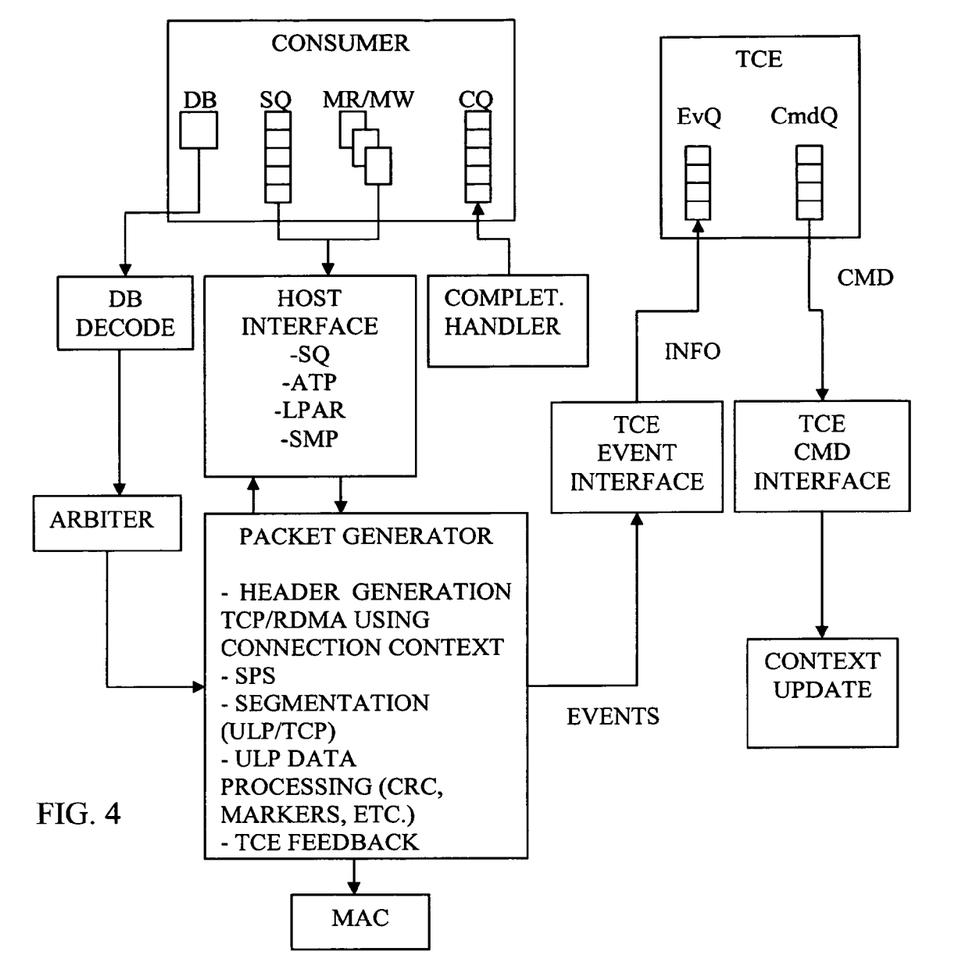
FIGS. 4 and 5 are a simplified block diagram and a flow chart, respectively, of a transmit flow path, in accordance with one non-limiting embodiment of the present invention.
Figure 5:
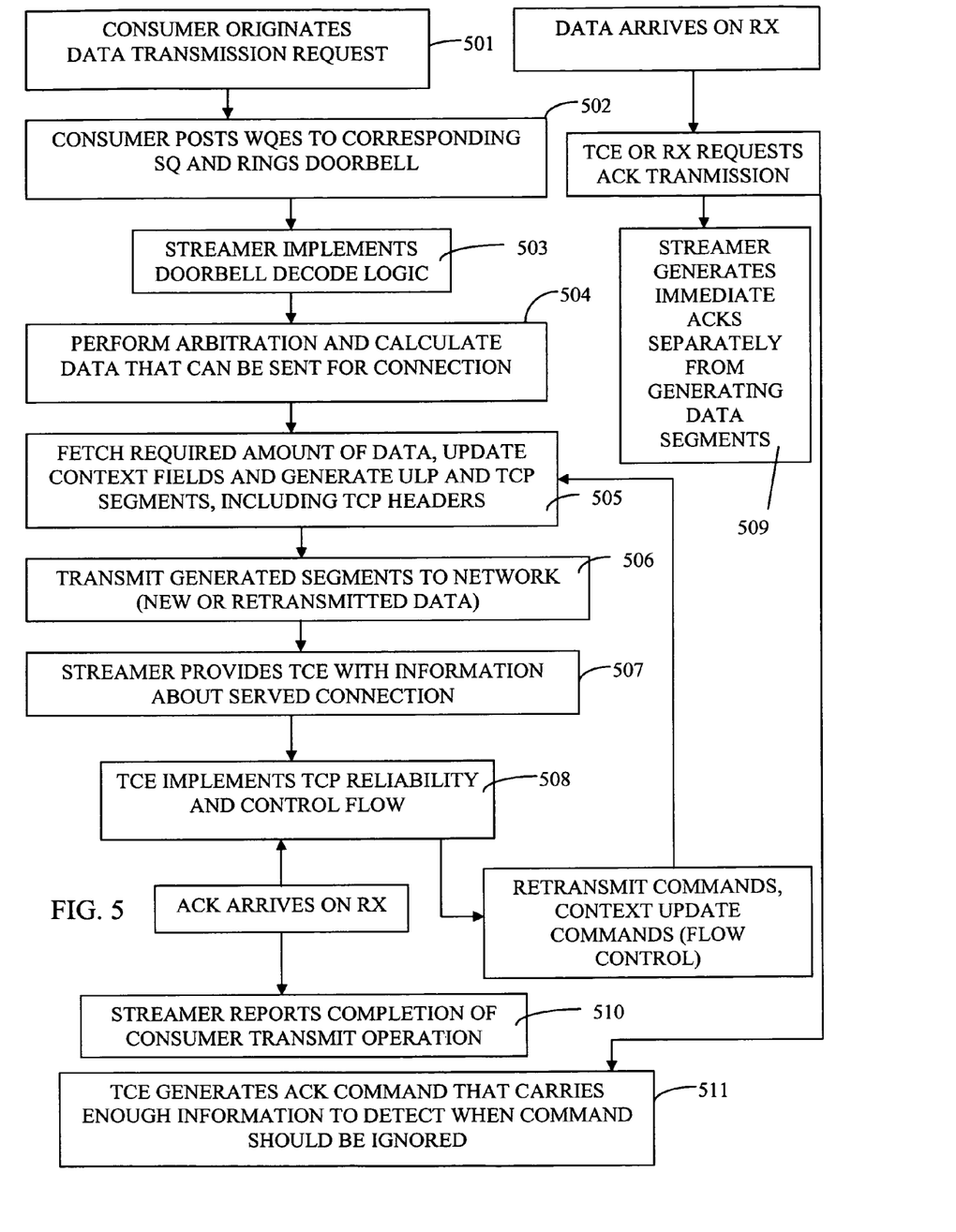

Reference is now made to FIGS. 4 and 5, which illustrate one non-limiting embodiment of a transmit flow path. (FIG. 4 is a block diagram and FIG. 5 is a flow chart—the step numbers refer to FIG. 5.)

First, some variables and fields from TCP terminology are explained:

Connection state variables:

SndUna (send unacknowledged)—sequence number of the first unacknowledged byte.

SndNxt (send next)—sequence number of the next byte to be transmitted.

SndWnd (send window)—number of bytes that can be transmitted. This reflects RcvWnd of the remote side.

RcvNxt (receive next)—sequence number of the next expected in-order data (end of received in-order data).

RcvWnd (receive window)—maximal buffer space that can be used for received data (starting from RcvNxt).

Packet fields:

SegSeq (sequence number)—Tx sequence number.

SegAck (Ack sequence number)—sequence number of the next expected Rx byte.

SegWnd (window)—receive window on the packet source side.

TSVal (Timestamp value)—value of the timestamp clock of the source.

TSEcr (Timestamp echo reply)—echo of the timestamp of received data acknowledged by this packet.

Data transmission requests may be originated by consumer 10 (step 501 in FIG. 5). The consumer 10 may post WQEs to the corresponding SQ (send queue), and ring a doorbell (step 502).

The streamer 14 may implement doorbell decode logic (step 503), which detects the MMIO (Memory Mapped Input/Output) write operation to the doorbell address space. The doorbell may carry information describing posted WQEs (like ConnID (connection identification), MsgCnt (message count), etc.). The doorbell decode logic may work in conjunction with the arbitration logic to update the connection context with information provided in the doorbell, and may decide whether and when the connection needs to be served.

The streamer 14 may use information kept in the connection context to perform arbitration and calculate the amount of data that can be sent for the given connection (step 504). This calculation is based on the data available in consumer buffers and transmit window. The information needed to estimate the transmit window may be kept in the connection context, and may be asynchronously updated by TCE via CmdQ interface using special context update commands. The streamer 14 may calculate the transmit window as a minimum between send window and congestion window. The send window can be updated either by the streamer 14 or by the TCE 16. The congestion window may be asynchronously updated by TCE 16 via CmdQ interface.

Once the connection to be served is selected, the streamer 14 may fetch the required amount of data, update context fields and generate ULP and TCP segments, including TCP headers (step 505), depending on the connection type.

In step 506, the streamer 14 may transmit generated segments to the network, e.g., via MAC (media access control) interface. A connection may be queued for arbitration for different reasons, and in accordance with the results of the arbitration, the streamer 14 may decide which kind of segment to transmit. For example, segments for new data transmission are generally transmitted upon a request from a consumer. Segments for new or old data transmission (e.g., retransmit segments) may be generated upon a request from the TCE 16. Segments for pure ACK transmission may be generated upon a request from TCE 16.

To generate TCP headers, streamer 14 may use information from the connection context. The context fields may be updated by the streamer 14 either independently upon different TCP events, or upon an asynchronous request passed from the TCE using CmdQ. For example, SegSeq may be generated using SndNxt, which may be updated by the streamer 14 after transmitting new data or upon a retransmit (timeout) request.

TSVal may be generated using a global timestamp clock counter which may be updated by the TCE 16 using the CmdQ interface.

SegAck, SegWnd and TSEcr may be generated using RcvNxt, RcvWnd and TSRecent respectively. These fields may be updated together either solely by TCE 16 or by both streamer 14 and TCE 16. Hereinbelow, a non-limiting example of Ack Triggering and Delayed Ack Implementation is explained and the methods used for that implementation may be used for updating the context fields as well.

At the end of each service cycle (streamer 14 may transmit more than single segment during the connection service cycle, depending on the available transmit window, posted data and transmit policies), streamer 14 may provide TCE 16 with information about the served connection (step 507), such as amount of transmitted data. This information may be passed to TCE 16 via EvQ interface. This information may be used by TCE 16 to implement TCP reliability and control flow (step 508), which may include, without limitation, setting retransmit timers, following after received acks, and requesting retransmit operation when needed (e.g., based on algorithms such as fast-retransmit, new-reno, SACK). In addition to information from step 507, TCE 16 may also act upon other events, such as but not limited to, incoming ACKs from the receiver, incoming data from the receiver and timeout expiration events. When required, TCE 16 may request streamer 14 to carry out the retransmit operation. Retransmit requests may be passed to streamer 14 via the CmdQ interface. The retransmit operation is described more in detail hereinbelow.

Upon data arrival, the streamer 14 may generate immediate acknowledgements separately from generating data segments (step 509). The ack generation request may come from the receiver streamer logic and/or from TCE 16. The ack generation is described more in detail hereinbelow.

The streamer 14 may also be responsible for reporting completion of the consumer transmit operation (step 510), which is based on information gathered from the received TCP Acks. This operation may be performed upon arrival of incoming ACKs passed directly from the receiver or via the TCE 16.

A non-limiting example of Ack Triggering and Delayed Ack Implementation is now explained. (As mentioned above, these methods may be used by streamer 14 for updating context fields).

With each TCP segment which passed fast-validation, streamer 14 may update acknowledgement information in the transmit portion of connection context (TS-echo and SN). This makes it possible to piggyback acknowledgement information while transmitting the data segments.

One non-limiting way of triggering acknowledgement is a combined triggering by the streamer 16 and the TCE 16. In this mode, streamer 14 may trigger acknowledgement for roughly each second full data segment. TCE 16 may perform delayed ack timer management, and trigger ack generation in case the timer expires. The streamer 14 may provide TCE 16 with the headers of the received TCP segments, and with an indication if the acknowledgement has been scheduled or not.

It is noted that although there may be a potential race problem, this can be handled by a simple indexing scheme, which may reduce delays in ack generation and in the latency of overall post-to-completion operation, without adding complexity to the hardware implementation. In the indexing scheme, the TCE 16 generates an ACK command to streamer 14, wherein the command carries enough information to detect when the command should be ignored (step 511) (e.g., in a case when the receiver already requested ACK for more recent data, before TCE 16 knew about it). The information needed to detect when the command should be ignored may include, without limitation, ack sequence number and a flag that forces sending an ack with the same sequence number as the last sent segment. The transmitter may have the last sent ack sequence number (for each connection) stored in memory, to be compared with the one in the current command to determine whether it may be ignored or not.

In another non-limiting embodiment, triggering acknowledgement may be accomplished solely by the TCE 16. That is, the streamer 14 does not make any triggering acknowledgement decision, and simply generates acks upon a command from the TCE 16. This embodiment eliminates the potential race problem mentioned above. Although it adds latency to the acknowledgement generation, it makes controlling the rate of inbound traffic possible for the given connection—if TCE 16 is a bottleneck, it slows down the ack generation rate, and thus slows down the rate of the new packet arrival, thereby creating a self-controlled and balanced system.

In any event, ack generation requests are placed to the dedicated ack generation queue, and do not go through the ready queue mechanism used for the data transmission. There is no attempt to perform ack piggybacking in the case of immediate or non-delayed acks. Ack generation is a relatively fast operation, which does not require fetching any WQE or data from the host memory, and therefore can be quite easily and quickly handled by streamer 14.

Figure 6:
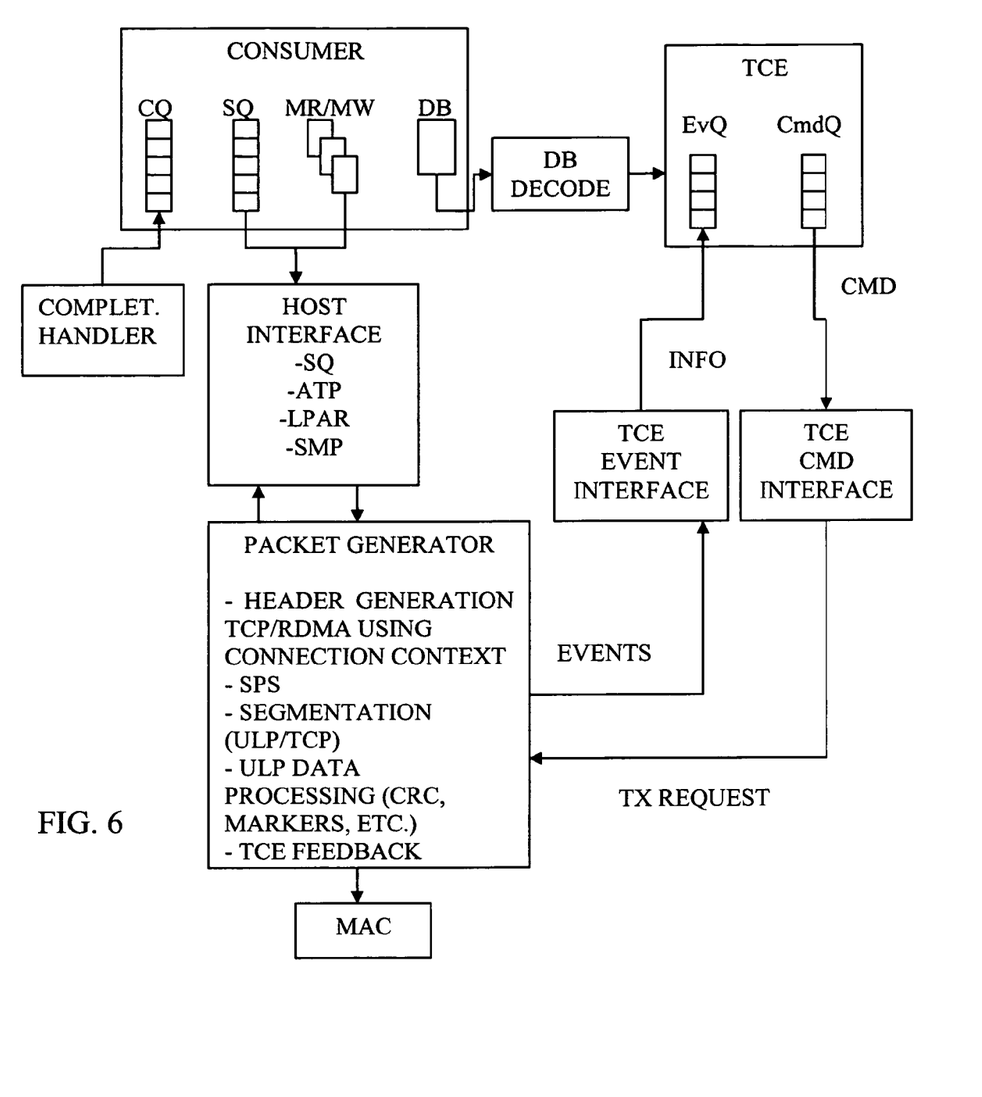
FIGS. 6 and 7 are a simplified block diagram and a flow chart, respectively, of a transmit flow path, in accordance with another non-limiting embodiment of the present invention.
Figure 7:
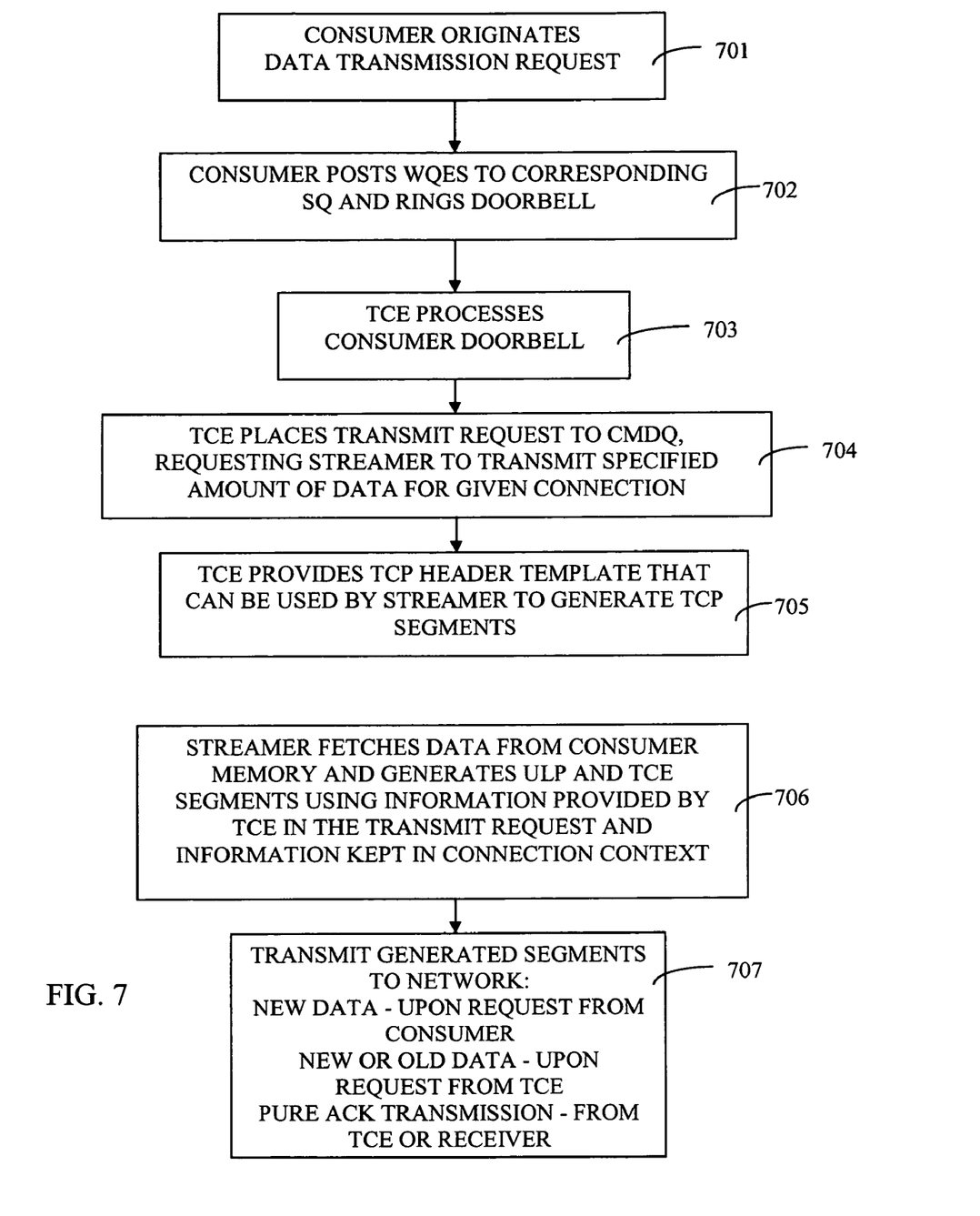

Reference is now made to FIGS. 6 and 7, which illustrate another non-limiting embodiment of a transmit flow path. (FIG. 6 is a block diagram and FIG. 7 is a flow chart—the step numbers refer to FIG. 7.) It is noted that only differences between the embodiments of FIGS. 5 and 7 are shown in FIG. 7 for the sake of simplicity.

As in the embodiment of FIGS. 4 and 5, data transmission requests may be originated by consumer 10 (step 701 in FIG. 7). The consumer 10 may post WQEs to the corresponding SQ (send queue), and ring a doorbell (step 702).

However, in the embodiment of FIGS. 6 and 7, the consumer doorbell is processed by TCE 16 (step 703) and not by streamer 14. Thus, TCE 16, among other things, detects the MMIO write operation to the doorbell address space. The detection of the MMIO write operation may require a special new or existing hardware, which may be part of the streamer 14 or of the CPU complex, or another hardware component. In any case the doorbell information is processed by TCE 16, no matter how the information is sent to TCE 16.

TCE 16 does not participate in WQE or data processing, and does not require access to the consumer memory space. All necessary information can be passed via the doorbell mechanism. As mentioned previously, the doorbell information includes the connection ID, information on the data size, message count, etc. Since the amount of data posted by the consumer is not necessary the same amount of data that is transmitted (e.g., perhaps due to additional data generated by RDMA), the type of connection also has to be available, either directly from the doorbell information, or indirectly from the connection context pointed by the connection ID.

TCE 16 processes the inbound doorbells, and may maintain its own connection state, decide whether and when to serve a particular connection, and take care of arbitration between different connections.

When TCE 16 decides that the new data can be transmitted on the given connection, it may place a special transmit request to the CmdQ, requesting from streamer 14 to transmit specified amount of data for the given connection (step 704). TCE 16 may also provide a TCP header template that can be used by streamer 14 to generate TCP segments (step 705).

Once streamer 14 receives the transmit request from TCE 16, it may fetch the data from the consumer memory (posted to the respective Send Queue), and generate ULP and TCE segments using information provided by TCE 16 in the transmit request and information kept in connection context (step 706).

In step 707, the streamer 14 may transmit generated segments to the network, e.g., via MAC (media access control) interface. A connection may be queued for arbitration for different reasons, and in accordance with the results of the arbitration, the streamer 14 may decide which kind of segment to transmit. For example, segments for new data transmission are generally transmitted upon a request from a consumer. Segments for new or old data transmission (e.g., retransmit segments) may be generated upon a request from the TCE 16. Segments for pure ACK transmission may be generated upon a request from TCE 16 or from the receiver.

Figure 8:
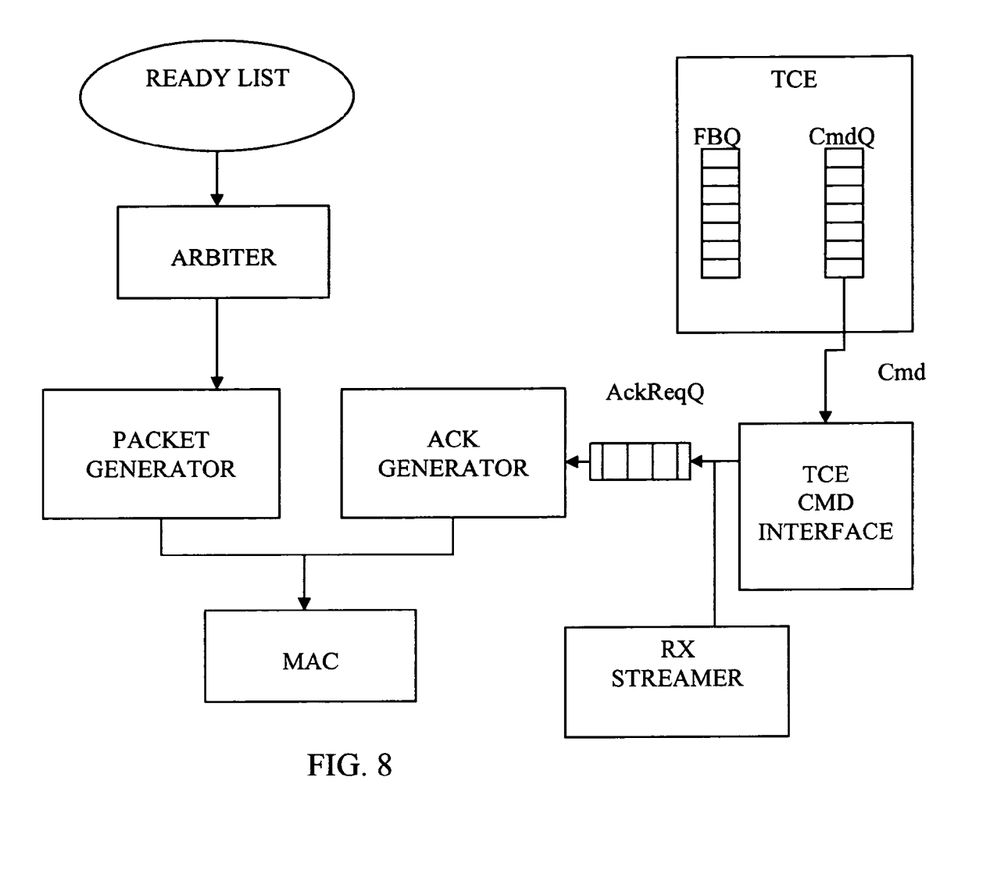
FIG. 8 is a simplified block diagram of acknowledgement segment generation in accordance with an embodiment of the present invention.

Reference is now made to FIG. 8, which illustrates a non-limiting example of acknowledgement segment generation in accordance with an embodiment of the present invention.

Ack generation requests may be passed via a special AckReqQ. The streamer 14 may serve requests from this queue independently from serving data generation requests coming from consumer 10 or TCE 16. Ack generation requests may be added to the AckReq queue either by streamer receiver logic, TCE 16 or both, depending on the operational mode of Ack Triggering and Delayed Ack Implementation.

Ack generation operation is much faster than generation of data segments, since it does not include such operations as WQE fetch, ATP and data fetch. Given the fetched connection context, this operation consists of building headers and transmitting generated segments. Accordingly, ack generation may be handled by dedicated logic, different and independent from the data segment generation logic.

AckReqQ may hold requests for generating so-called immediate Acks, Window Probes, or other TCP segments that do not carry the data or (or which carry invalid data). Immediate Acks are Acks that should not be piggybacked with the data segments, such as an acknowledgement due to reception of out-of-order segments or delayed ack's.

The retransmit operation may include, without limitation, the TCE 16 tracking transmitted data and non-acknowledged data. The TCE 16 may manage retransmit timers, ack information, and may count duplicated acks, SACK information, etc. When TCE 16 detects a retransmission condition, it may pass a special retransmit request to streamer 14 via the CmdQ interface, providing information necessary for carrying out the retransmit operation, such as the SN from which to retransmit, and the amount of data to retransmit. The TCE 16 may also request the streamer 14 to initiate complete retransmit (i.e. to move the SndNxt pointer back to SndUna). This information is sufficient to perform different types of retransmit operations, such as Fast Retransmit, Tout retransmit and SACK retransmit operations.

The streamer retransmit operation is loosely coupled with the completion operation, i.e., the retransmit operation does not require completion of all preceding acknowledged WQEs. The retransmit logic may get a retransmit request, and may use the pointer to the last completed WQE as a reference to search the segment to retransmit. This pointer might not be updated with the latest completion information, but it still holds a consistent information (pointer on WQE, and SN of this WQE).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for data transmission, comprising:
receiving data for transmission to a communication network from a consumer application running on a host CPU by exchanging work queue elements via send and receive queues and completion queue elements via a completion queue in a host interface between the consumer application and an acceleration engine;
processing the data so as to produce one or more Transport Control Protocol (TCP) segments comprising TCP packets belonging to a given connection by:
performing TCP control operations on the packets of the given connection using a protocol processor, wherein performing the TCP control operations comprises processing information from a consumer doorbell;
generating the TCP packets of the given connection by performing TCP data movement operations using the acceleration engine simultaneously and asynchronously with performing of the TCP control operations by the protocol processor; and
communicating between the acceleration engine and the protocol processor using an asynchronous queue interface which is separate from the host interface and comprises a command queue for conveying commands from the protocol processor to the acceleration engine and an event queue for reporting events from the acceleration engine to the protocol processor; and
transmitting the TCP segments to the communication network.

2. The method according to claim 1, wherein receiving the data comprises accepting by the acceleration engine a transmit request that is placed by the consumer application in a transmit request queue, and accepting an indication of availability of the transmit request using a doorbell ringing mechanism.

3. The method according to claim 1, wherein generating the TCP packets comprises updating a connection context of the given connection with information provided in the consumer doorbell.

4. The method according to claim 1, wherein generating the TCP packets comprises processing information related to a connection context of the given connection to as to generate the TCP segments.

5. The method according to claim 1, wherein generating the TCP packets comprises processing information related to a connection context of the given connection so as to calculate an amount of the TCP segments that can be generated for the connection context.

6. The method according to claim 1, wherein generating the TCP packets comprises generating a retransmit segment.

7. The method according to claim 6, wherein generating the retransmit segment comprises tracking transmitted data and non-acknowledged data, and requesting the acceleration engine to initiate retransmission responsively to the tracked data.

8. The method according to claim 1, wherein generating the TCP packets comprises generating an acknowledgment segment.

9. The method according to claim 8, wherein generating the acknowledgement segment comprises passing an acknowledgement segment generation request via a queue.

10. The method according to claim 9, and comprising serving a request from the queue by the acceleration engine independently from serving data generation requests from a consumer or from the protocol processor.

11. The method according to claim 8, wherein generating the acknowledgment segment comprises issuing to the acceleration engine an ACK command, which carries sufficient information to detect that the ACK command is to be ignored.

12. The method according to claim 1, wherein performing the TCP control operations comprises updating information in a connection context of the given connection asynchronously with respect to operation of the acceleration engine.

13. The method according to claim 1, and comprising, after transmitting a given TCP segment, providing information from the acceleration engine to the protocol processor regarding transmission of the given TCP segment to the given connection.

14. The method according to claim 13, wherein performing the TCP control operations comprises implementing TCP reliability and control flow operations responsively to the information provided by the acceleration engine.

15. The method according to claim 1, wherein generating the packets comprises reporting completion of transmission of the TCP segments by the acceleration engine.

16. The method according to claim 1, wherein transmitting the TCP segments comprises operating the protocol processor as a mediator between the acceleration engine and a consumer to whom the TCP segments are transmitted.

17. The method according to claim 1, wherein processing the information comprises updating a connection context of the given connection with the information from the consumer doorbell.

18. The method according to claim 1, wherein performing the TCP control operations comprises posting a transmit request to the acceleration engine.

* * * * *